July 2, 1940.  E. T. PRICE  2,206,752
DUAL AXLE DRIVING UNIT FOR MOTOR VEHICLES
Filed Aug. 16, 1937  3 Sheets-Sheet 1
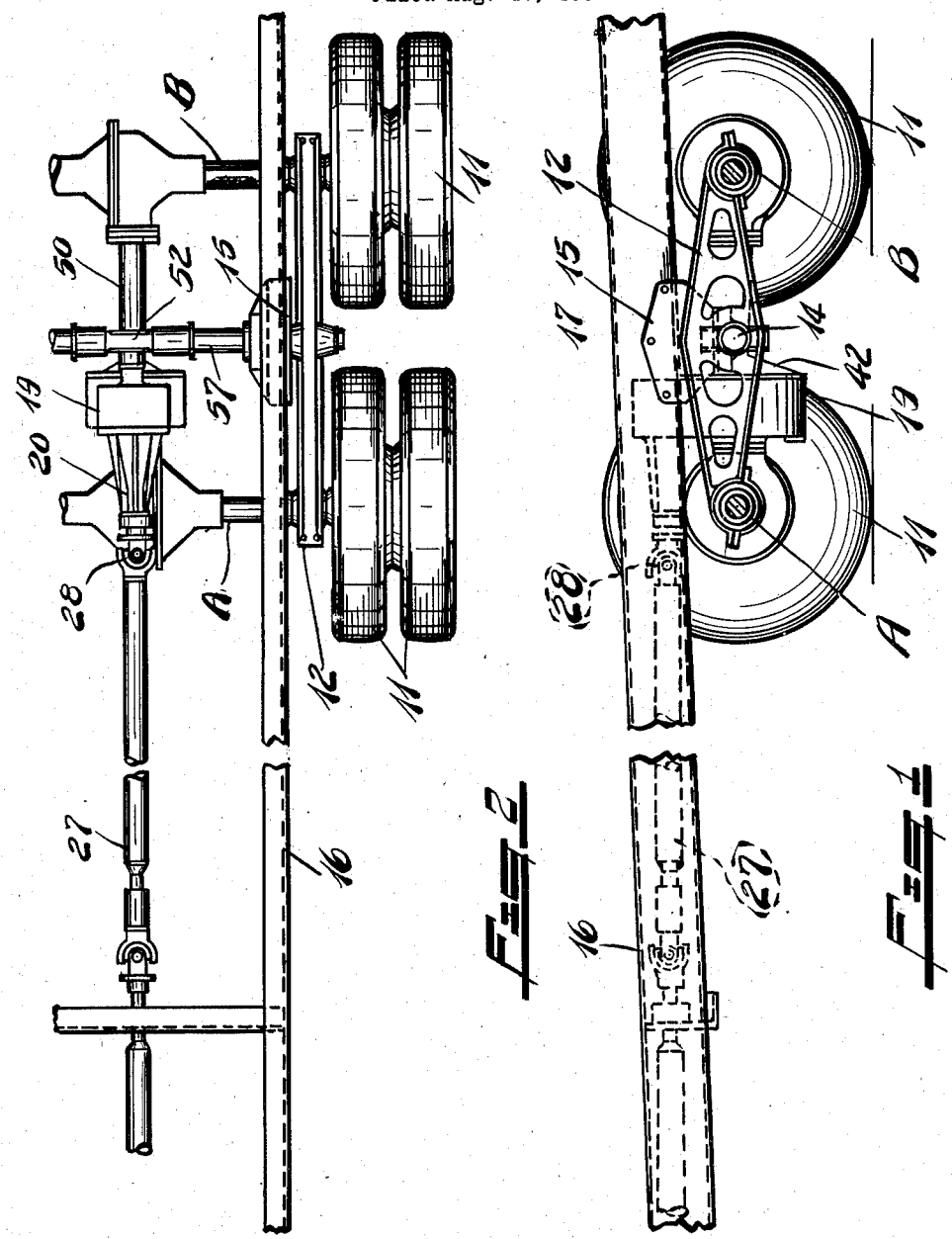
INVENTOR.
Edward T. Price.
BY Frank C. Karman
ATTORNEY.

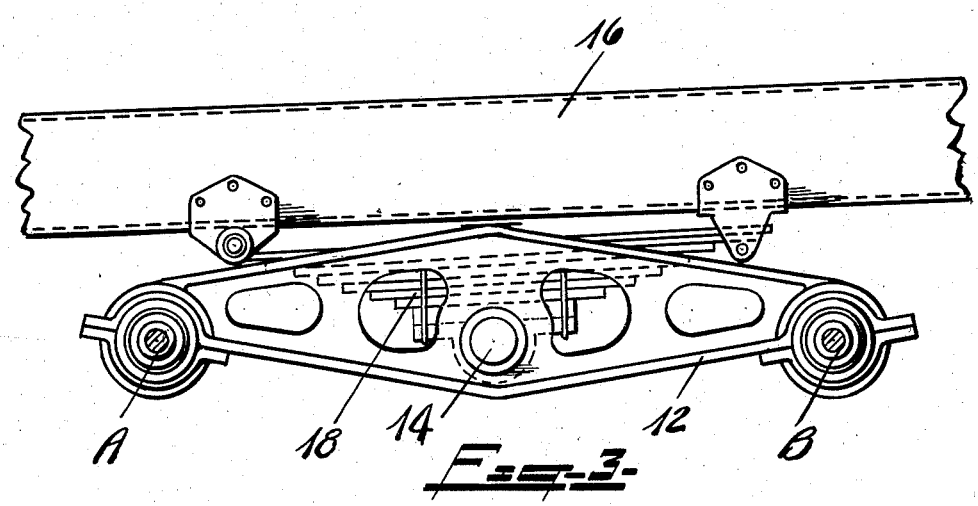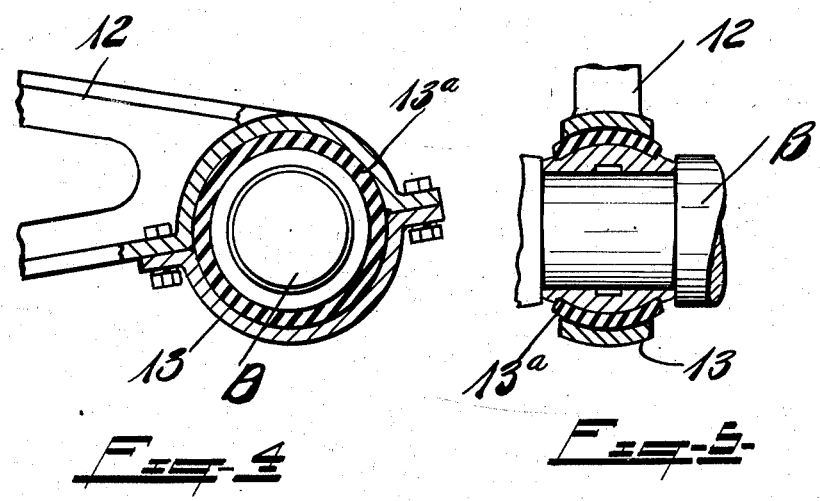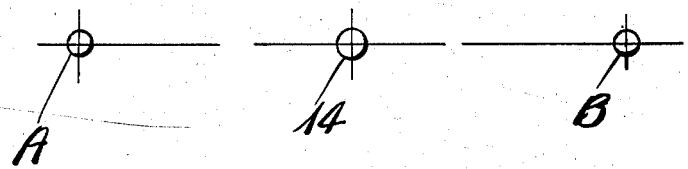

July 2, 1940.    E. T. PRICE    2,206,752
DUAL AXLE DRIVING UNIT FOR MOTOR VEHICLES
Filed Aug. 16, 1937    3 Sheets-Sheet 3
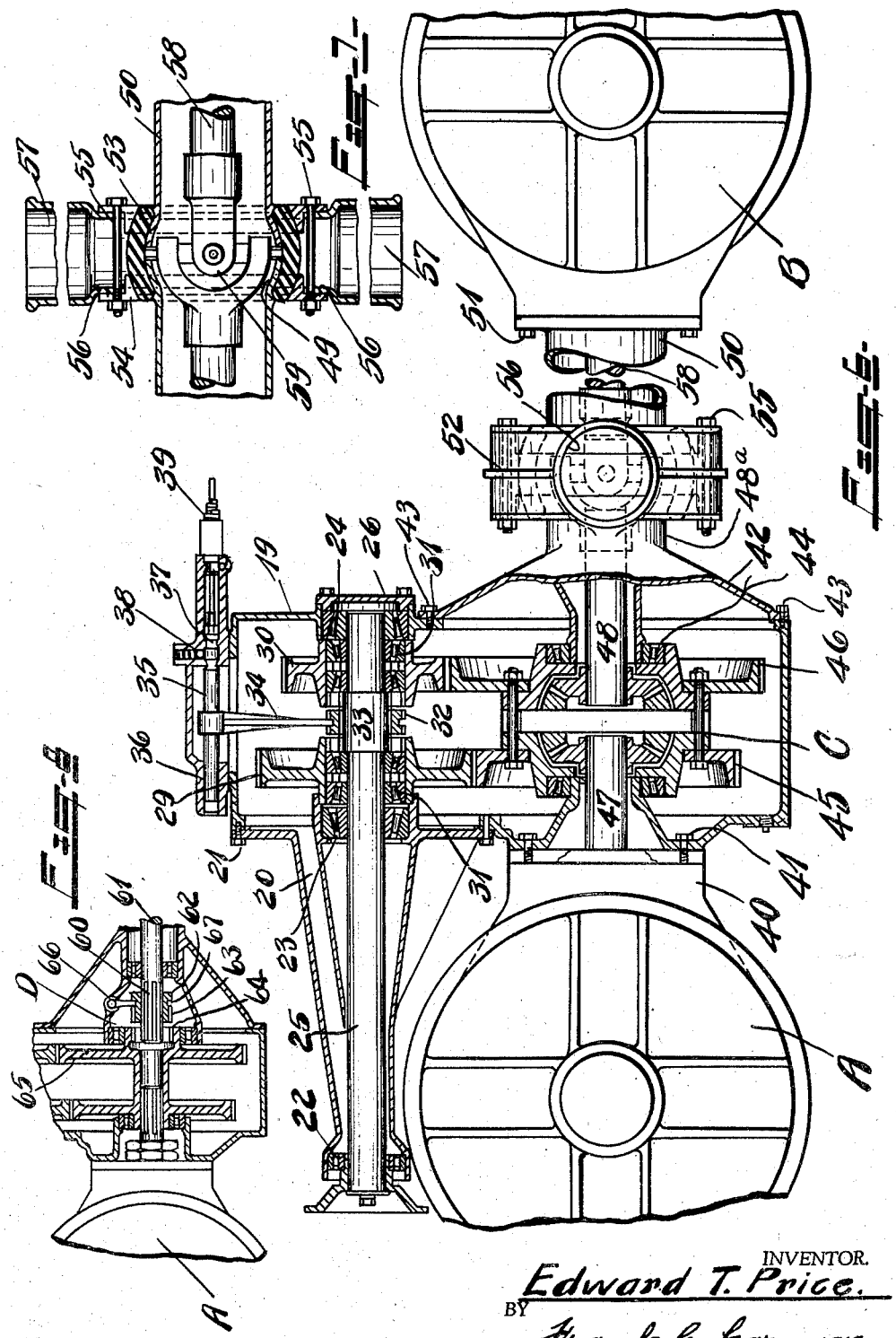
INVENTOR.
Edward T. Price.
BY Frank C. Earman.
ATTORNEY.

Patented July 2, 1940

2,206,752

UNITED STATES PATENT OFFICE 2,206,752

DUAL AXLE DRIVING UNIT FOR MOTOR VEHICLES

Edward T. Price, Cadillac, Mich., assignor to Cadillac Malleable Iron Co., Cadillac, Mich., a corporation of Michigan Application August 16, 1937, Serial No. 159,258

3 Claims. (Cl. 180—22)

This invention relates to dual axle driving units for automotive vehicles, and more particularly to a construction provided with two driving axles having interconnected driving and attaching mechanism so arranged that the wheels of said axles are free to assume different levels caused by irregularities in the surface of the roadway without affecting load distribution on the wheels, without exerting bending or twisting strain on the mechanism, and without affecting the efficiency or smoothness of the power transmitted to each driving axle.

One of the prime objects of the invention is to design a dual axle drive in which all driving and brake torque loads, as well as all thrust loads from each driving axle are transmitted directly and independently to the frame.

Another object is to design a dual axle drive in which leaf springs are optional, the omission or addition of said springs in no manner affecting the operation of the equipment.

A further object is to design a dual axle drive which eliminates the necessity for specially designed torque rods and their wearing parts, thus providing an exceedingly simple and easy assembly.

A further object still is to provide a dual axle drive construction which requires but a single propeller shaft system and provides means for disengaging the drive to the rear axle so that it may function as a load carrying or trailing axle only when desired.

A still further object is to design a dual axle drive in which standard axles are used and provide a power dividing transfer case, also provided with standard parts, bearings, etc. so that all parts are interchangeable and standard, this standardization making the assembly easy and economical to manufacture, service and maintain.

With the above and other objects in view, the present invention consists in the combination and arrangement of parts, hereinafter more fully described, illustrated in the accompanying drawings and more particularly pointed out in the appended claims, it being understood that changes may be made in the form, size, and minor details of construction without departing from the spirit or sacrificing any of the advantages of the invention.

In the drawings:

Fig. 1 is a fragmentary part sectional side elevational view of the chassis of a motor vehicle, equipped with my dual axle drive.

Fig. 2 is a fragmentary top plan view.

Fig. 3 is an enlarged fragmentary part sectional detail showing the vehicle equipped with leaf springs.

Fig. 4 is an enlarged fragmentary transverse sectional view showing the bearing and connection of the end of the rocker beam to the axle, and Fig. 5 is a fragmentary longitudinal sectional view through the bearing shown in Figure 4.

Fig. 6 is an enlarged fragmentary part sectional side elevational view of the driving axles and transfer case.

Fig. 7 is an enlarged sectional plan view of the housing which supports the ends of the driving shaft sleeves.

Fig. 8 is a fragmentary sectional detail showing means for disconnecting the drive to the rear axle.

Fig. 9 is a diagrammatic view showing the axles and trunnion in the same plane.

Referring now more specifically to the drawings in which I have shown the preferred embodiment of my invention, the letters A and B indicate a pair of conventional axles of standard design on which the ground engaging wheels 11 are journaled in the usual manner.

Rocker beams 12 are connected at their ends to the axles A and B, a bearing 13 being provided at each end and includes a resilient collar 13ª which surrounds the axle, thus providing a resilient yielding connection. Each beam is pivotally connected at its center to trunnions 14 which are held in place by trunnion brackets 15, and which are in turn rigidly secured to the vehicle frame 16 by means of bolts 17, or as an optional assembly these trunnion brackets 15 may be secured to leaf springs 18 which are mounted in the conventional manner, and as clearly shown in Fig. 3 of the drawings, and I wish to direct particular attention to the fact that the pivoting point of the rocker beams is on a horizontal line through the center of the axles. This is necessary to maintain equal load distribution on the wheels regardless of their relative heights.

A transfer case 19 is located between the drive axles A and B and comprises a preferably cast housing provided with a hollow, tubular extension 20, the inner end of which is secured to the face of the housing by means of bolts 21, and the outer end being enlarged to accommodate a standard bearing assembly 22, a similar bearing assembly 23 being provided on the inner end of the extension. Another bearing assembly 24 is provided in the rear of the housing and a propeller shaft 25 is journalled in these bearings 22, 23, and 24, a suitable opening being provided in the rear of the housing to facilitate adjustment of the bearings 24 etc., and a cover plate 26 forms a closure for said opening. This propeller shaft 25 is connected to the main propeller shaft section 27 by means of the universal joint 28 and is driven from the vehicle power plant, (not shown) in the usual manner.

Spaced apart gears 29 and 30 respectively are mounted on bearings 31 provided on the shaft 25, and a toothed shifting collar 32 is slidably mounted on the enlarged section 33 of the shaft, said collar being actuated by means of the shifting fork 34 which is mounted on the shaft 35, and is shiftable into or out of engagement with one or the other of the gears 29 and 30 in the conventional manner. The gearing shown provides two driving speeds, and it will be readily understood that this design can be readily adapted to one speed by omitting the shifting mechanism and one set of gears.

The shaft 35 is journaled in bearings 36 provided in the housing and is formed with spaced apart turned sections 37, a spring pressed ball 38 serving to hold said shaft in adjusted position, the shifting being done by the vehicle operator through the control rod 39 as usual.

The front end of the transfer case 19 is secured to the neck 40 of the forward driving axle by means of bolts 41, and a bell shaped section 42 is secured to the rear end of the case by means of bolts 43, a differential assembly C being mounted on bearings 44 provided in the housing, and includes gears 45 and 46 respectively which mesh with the gears 29 and 30, and the stub shaft 47 projecting into the axle A, and the shaft 48 extending into the tubular portion of the section 42, the end of the tubular portion 48a terminating in a semi-spherical member 49 as clearly shown in Fig. 7 of the drawings.

A hollow, tubular shell 50 is attached to the rear axle by means of bolts 51, the opposite end of said shell being also semi-spherical in shape, and these semi-spherical ends are secured together by means of a housing 52, which housing is supported between and secured to either the frame side members, or the leaf springs, thus providing a universal spherical joint which will in no manner hinder free movement of the axles in any direction, but which will absorb torque loads from both axles, and prevent any torque load being transmitted from one axle to the other.

This housing 52 includes a resilient collar 53 which embraces the semi-spherical ends of the section 42 and 49, spherical faced flanges 54 secure the resilient collar in the housing and bolts 55 secure all parts in assembled relation. Opposed tubular sockets 56 are formed integral with the housing 52 and supporting beams 57 are secured therein, the outer ends of said beams being secured to the trunnion brackets 15 in any approved manner.

A stub shaft 58 forms a part of the interconnecting drive shaft and leads to the rear axle, a standard universal joint 59 connecting the shafts 48 and 58, so that power is transmitted to the rear axle when the mechanism is driven, this joint 59 compensating for any misalignment caused by slight deflection of the rocker beams under load. Due to the very nominal angularity of all joints in this design there is very little stress and strain on the joints, making possible the use of standard universal joints which can be purchased economically.

It will, of course, be understood that the outer ends of the beams 57 may project through the trunnion brackets and form the trunnions on which the rocker beams are mounted, or the trunnions may be cast integral with the brackets if desired.

In Fig. 8 of the drawings I have shown a slightly different construction which can be used when the third differential is omitted, said construction including a declutching mechanism D for disconnecting the rear driving axle B so that said axle may function as a load carrying or trailing axle only when desired. In this construction the end section 60 of the shaft 61 is splined, and a splined shifting collar 62 is mounted on said splined section, said collar being toothed as at 63 for engagement with the toothed section 64 provided on the gear 65, a shifting lever 66 engaging a groove 67 provided in said collar, and when this collar is in position as shown in Fig. 8 of the drawings, the rear driving axle will be disconnected and will function as a load carrying or trailing axle only, but when the collar is shifted to cause the toothed end of said collar to engage the teeth 64 provided on the gear 65 the axle will then be connected with the companion axle and function as a driving axle.

This design has many advantages not present in dual wheel drive units at present on the market in that the driving power is close to and directly over the top of the forward axle permitting a practically straight line drive from the motor without changing the mounting or location of the motor. The propeller shafts and joints are also below the top level of the vehicle frame which is also very advantageous in providing necessary clearances etc. All parts are standardized and interchangeable, and the transfer case adapts itself to change speed gearing providing the operator with a selection of gear ratios to give a maximum of vehicle performance.

What I claim is:

1. A motor driven vehicle comprising a frame, downwardly extending brackets carried by opposite sides of said frame, rock beams mounted on the brackets to the outside thereof, driven axles rotatably mounted in the ends of the rock beams, a transfer casing between the axles, a transmission mechanism in said casing, a driving connection between the transfer mechanism and one of the axles, an extension section carried by one side of the transfer casing and extending towards the other axle, a shell carried by the last named axle and extending towards the extension section, said extension section and shell having a yieldable connection, a supporting housing for said yieldable connection, a universal drive connection between the transmission mechanism and the last named axle and in the shell and extension section, means for supporting said housing from the downwardly extending brackets, said supporting means comprising extension members carried by opposite sides of the housing and inwardly extending members carried by the downwardly extending brackets and having their inner ends pivotally mounted in the housing extension members.

2. A device as set forth in claim 1 wherein the axles and pivotal points of the housing are in the same horizontal plane.

3. A device as set forth in claim 1 wherein the driving connection between the transmission mechanism and the other of the axles is provided with a universal joint on the axis of the supporting housing and within the yieldable connection on the axis of the yieldable connection.

EDWARD T. PRICE.